Oct. 11, 1960 P. E. OHMART 2,956,166
LOW NOISE LEVEL MEASURING AND CONTROL APPARATUS
Filed Oct. 16, 1953 2 Sheets-Sheet 1

INVENTOR.
Philip E. Ohmart.
BY
Wood, Herron & Evans.
ATTORNEYS.

United States Patent Office 2,956,166
Patented Oct. 11, 1960

2,956,166

LOW NOISE LEVEL MEASURING AND CONTROL APPARATUS

Philip E. Ohmart, Cincinnati, Ohio, assignor to The Ohmart Corporation, Cincinnati, Ohio, a corporation of Ohio Filed Oct. 16, 1953, Ser. No. 386,431

5 Claims. (Cl. 250—83.6)

This invention relates to measuring and control apparatus, and is particularly directed to apparatus of this type embodying a radiant energy electric generator as a condition sensing element.

In recent years there has been a marked trend in many industries toward a more extensive use of automatic process controls and telemetering systems for indicating the values of measurements made at points quite remote from the points of indication. Most of these devices depend for their operation upon an electric signal produced by a condition sensing element, the magnitude of the signal being correlated with the value of a variable condition being measured or controlled. Among the many elements which have been proposed as condition sensing elements are thermistors, hydrophilic gel resistors, photoelectric cells, ionization chambers, and radiant energy electric generators, or Ohmart cells.

The principal difficulty with some of these elements is that their use is extremely limited, since they can be employed to index only one, or at most, a very few variable conditions. Furthermore, most condition sensing elements cannot be used unless the quantity to be indexed is directly accessible, and hence they cannot be employed to determine characteristics of such inaccessible materials as fluids in a closed container.

An Ohmart cell or radiant energy electric generator, however, is free from these particular limitations and is adapted for the measurement of a wide variety of different variable conditions, whether or not the conditions are directly accessible. An Ohmart cell depends for its operation upon the attenuating effect of a variable condition upon the radiations impinging upon the cell from a radioactive source, X-ray tube, or other suitable emitter.

As an example of how an Ohmart cell can be arranged to measure or control an inaccessible variable condition suppose that it is desired to measure the thickness or density of a strip of material. To accomplish this by means of an Ohmart cell, an emitter such as a quantity of radioactive material is disposed upon one side of the sheet and an Ohmart cell is disposed upon the opposite side so that a portion of the radiations emitted by the radioactive material pass through the sheet and impinge upon the Ohmart cell while other portions of the radiation are absorbed by the sheet being measured. It has been determined that an Ohmart cell produces a current which varies in a predetermined manner with the quantity of radiant energy passing through the sheet, and that this current can be employed as an accurate index of the thickness or density of the sheet material.

As will be readily appreciated from the above example it is totally unnecessary for an Ohmart cell to come into direct association with the quantity being measured so long as the cell is arranged so that the radiations impinging upon it are affected by the variable condition. Consequently, an Ohmart cell is free from those limitations which greatly restrict the utility of many other condition sensing elements. However, the very nature of Ohmart cell operation inherently introduces a difficulty which prior to this invention has adversely affected the performances of some apparatus embodying Ohmart cells, especially where extremely accurate measurements or fine control is desired.

This difficulty is due to the wide random fluctuations in the magnitude of the current generated by an Ohmart cell even when it is operated under completely steady state conditions; that is, when it is associated with a fixed source of radioactive energy and a constant value of a variable condition. Thus, while over a period of time an Ohmart cell will produce an average current which will accurately index a variable condition, the current flowing at any particular instant often provides a highly erroneous indication of the value of that condition.

As will readily be appreciated by those skilled in the art, a very similar difficulty is encountered in the operation of ionization chambers, and in fact with these latter devices the magnitude of random current variations has been observed to be as high as seventy percent of the average current flowing during a given period. When the current flow of either and Ohmart cell or an ionization chamber is employed to operate measuring or control apparatus, these current variations are extremely objectionable since they result in highly undesirable fluctuations in the position of the indicator or recorder needle, or in the faulty actuation of a control device at a time when the variable condition does not require any corrective action by such device.

The principal object of the present invention is to provide an Ohmart cell especially adapted for use in control or measuring devices, the cell being effective to generate a current which is substantially free from random fluctuations so that the current always represents an accurate index of the variable condition. Consequently, when such a cell is used in conjunction with apparatus for controlling a variable condition, the apparatus is actuated for corrective action only when the operation of the apparatus is required by the state of the variable condition. Similarly, if a cell of this invention is employed as a part of a measuring device, the indicator needle remains free from objectionable fluctuations due to random current variations.

More specifically, the present invention is predicated upon the empirical discovery that when an Ohmart cell, the current output of which is employed to index a variable condition, is operated so that its ion collection efficiency is kept below approximately eighty-five percent, the cell will produce a current which is accurately correlated with the value of the variable condition and is substantially free from undesirable random fluctuations. For the purposes of the present discussion, random current fluctuations not attributable to changes in the variable condition, will be referred to as "noise"; and the term "noise level" will be employed to denote the relative magnitude of these random fluctuations and the average signal magnitude.

In order that the significance of this objective may be more fully appreciated, it is considered helpful to briefly review the principles of Ohmart cell construction and operation as set forth in my copending applications on "Method of Converting Ionic Energy Into Electrical Energy," Serial No. 638,592, filed November 7, 1952, and "Comparator," Serial No. 280,842, now Patent No. 2,763,790, filed April 5, 1952, and to explain other principles which have subsequently been discovered. As explained in these copending applications, all other factors being held constant, the current which is produced by an Ohmart cell, and which flows through an external circuit connecting the cell electrodes, varies in a predetermined manner with the density of the impinging ionizing energy. The ionizing energy may be obtained from any number of sources; for example radioactive material such as strontium 90, X-ray tubes, and ultra violet lamps.

This current generating characteristic of an Ohmart cell is useful for purposes other than measuring radiant intensity, since by arranging a source of radiant energy and an Ohmart cell in such a manner that the density of the impinging energy varies in accordance with variations in a condition to be measured, the current developed by the cell can be used as an index of the variable condition.

The theory of Ohmart cell operation, and the details of cell construction, are described in greater detail in the above mentioned copending applications. It will suffice here to state that essentially an Ohmart cell, or a radiant energy electric generator, comprises three elements: a first electrode, a second electrode electrochemically dissimilar from the first, and electrically insulated from it, and an ionizable gas in contact with the two. Due to the chemical asymmetry of the electrodes, a field bias is created between them. When the gas is ionized by the impingement of ionizing radiation, or by secondary radiation, in turn caused by the ionizing energy, there will be discriminatory migration of the ions toward the electrodes. The positive ions will move toward the more noble electrode, and the negatively charged electrons will move toward the more active electrode. These particles will collect on the respective electrodes, causing a potential difference to be built up between them.

If an external leakage path is provided between the electrodes, the electrons pass through the external path from the negative electrode toward the positive electrode where they neutralize the positive ions to form gas molecules. For each electron that is picked up by a positive ion, an additional electron flows through the external circuit from the negative to the positive electrode. The magnitude of current flow is dependent both upon the density of the impinging ionizing energy and the impedance of the external circuit.

There is a third factor which influences the magnitude of the current produced; this factor I shall term the "ion utilization efficiency" of a cell. Suppose that in a cell a given number of ions is formed by the impingement of radiating energy upon the gas molecules. If a cell is constructed so that each of the ions which is thus formed migrates, under the influence of the field bias, to the positive electrode of the cell and is there neutralized by an electron to form a neutral molecule, the cell produces a maximum current and is said to have a hundred percent ion utilization efficiency. If in contrast, the cell is constructed so that only a portion of the ions formed are neutralized at the positive electrode, while the remaining ions are neutralized by recombination with electrons in the gaseous space, the cell produces a lesser current and is said to have an ion utilization efficiency corresponding to the percentage of the ions formed which migrate to and are neutralized at the positive electrode.

Among the factors which influence the ion utilization efficiency of a cell are the electrode spacing, the chemical asymmetry of the electrodes, the filling gas pressure, the molecular weight and composition of the filling gas and the closed circuit voltage. The influence of these individual factors will be discussed in greater detail below in conjunction with a description of the accompanying graphs. It will suffice here to state that by adjusting various of these factors, the ion utilization efficiency of a cell can readily be varied from a few percent to almost one hundred percent.

The discovery which forms the basis of the present invention is that if an Ohmart cell is constructed and operated at less than an eighty-five percent ion collection efficiency, the noise present in the output of the cell is minimized. In other words, if an Ohmart cell is operated so that an appreciable number of ions formed by the impinging energy are not utilized, but rather are lost due to recombination of the positive ions and electrons elsewhere than at the positive electrodes, random current fluctuations are substantially eliminated. Furthermore this is accomplished without any lengthening of the response time.

This leads to the very paradoxical result that to use an Ohmart cell most effectively to measure or control a variable condition, a portion of the minute current generating capacity of the cell should be purposely wasted. This is even more striking in view of the fact that the maximum current output of Ohmart cells now being produced is of the order of one billionth of an ampere or less, and the current produced in many cells is less than one trillionth of an ampere. Thus, it has been found that by decreasing this already minute current output by constructing, or operating a cell in an "inefficient" manner, it is possible to obtain much more accurate control or measurement than if the cell is operated so that its entire current producing capacity is utilized.

I have determined that random fluctuations in the magnitude of the current produced in an Ohmart cell can be attributed to similar random fluctuations in the number of ions formed within the cell. As will readily be appreciated by those skilled in the art, even when all of the other variable conditions are held constant, the energy emitted from a radioactive source, an X-ray tube, or other emitter, is subject to statistical variations and is by no means a constant quantity. Moreover, the number of ions produced by a given quantity of radiant energy also varies as a probability function. Thus, the total number of ions in the migrating plasma of an Ohmart cell is not constant, but varies in a random fashion; it is this statistical variation in the density of the ion plasma which manifests itself as noise.

In order to account for the substantial elimination of noise when an Ohmart cell is operated at less than a hundred percent ion utilization efficiency, I have postulated that when a greater number of ions is formed than can be effectively influenced by the electrodes the ions become unevenly distributed throughout the gaseous space surrounding the cell electrodes. More specifically, I have postulated that the positive ions, as they migrate toward the positive electrode, from a dense cloud adjacent the surface of that electrode. As a consequence of this dense cloud, if the radiation is instantaneously effective to form a larger number of ions, the progress of these ions toward the positive electrode is impeded by the ion cloud so that despite a surge in the total number of ions, the current generated by the cell increases only slightly.

Similarly, if the rate of ion formation is suddenly decreased, the positive electrode is nevertheless effective to attract practically the same number of ions from the dense cloud as before, since the number of ions in the cloud exceeds the number that can be attracted during any brief period. Of course if the rate of impinging ionization is permanently reduced, after a short interval the density of the ion cloud is similarly decreased, and the rate of ion attraction to the positive electrode again accurately reflects the average rate of ion formation.

I have determined that by operating a cell at less than eighty-five percent ion collection efficiency, an ion cloud of sufficient density is formed so that the effects of instantaneous statistical variations in the rate of ion formation are eliminated. I have also experimentally determined that after a brief period the density of the ion cloud also changes in accordance with the new rate of ion formation so that the responsiveness of the cell to changes in the variable condition is not adversely affected.

It is another object of the present invention to provide a method for adjusting certain factors of cell construction so that a cell may be operated at a predetermined ion utilization efficiency. Briefly, this method involves the steps of operating the cell at approximately one hundred percent ion collection efficiency by impressing an external potential across its electrodes until the magnitude of current flow through the cell reaches a maximum value. Next the external potential is removed and one or more of the cell construction factors is adjusted until the current output of the cell reaches a predetermined fraction of the cell's maximum current output, the fraction corresponding to the predetermined value of ion utilization efficiency.

From the foregoing discussion of the principles of the present invention, and from the following detailed description of the drawings showing embodiments of the invention and the specific relationship of various factors involved, those skilled in the art will readily comprehend the various ramifications of this invention.

Figure 1:
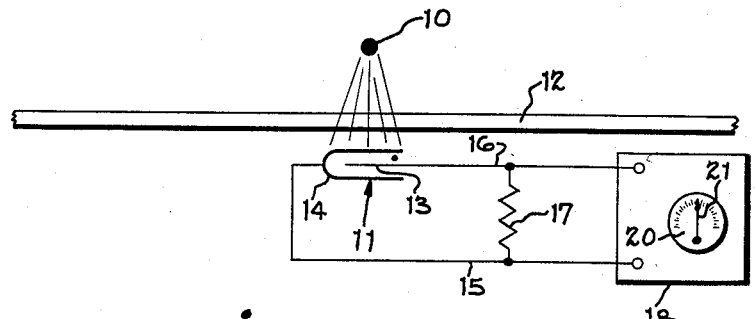
Figure 1 is a diagrammatic view of a measuring device constructed in accordance with the present invention.

Figure 1 shows a typical embodiment of a measuring device embodying an Ohmart cell as a condition sensing element. As there shown a source of radioactive energy 10 and an Ohmart cell 11 are disposed relative to a variable condition, for the purposes of this illustration the thickness of a sheet of material 12, in such a manner that the intensity of the ionizing radiations impinging upon the Ohmart cell is attenuated by the variable condition. It is to be understood that an X-ray tube or other source of penetrative radiation could be substituted for the radioactive material and the apparatus would function in the same manner. In the example shown the strip of material 12 will absorb a portion of the radiation emitted by the source 10 and will thus attenuate the amount of radiation impinging upon the cell 11. It is apparent that as the thickness of strip 12 increases, the amount of radiation which is absorbed by the sheet will also increase, and consequently the amount of radiation impinging upon the cell 11 will decrease. Conversely, as the thickness of the sheet decreases, a larger amount of radiation will penetrate the sheet and impinge upon the cell. The Ohmart cell produces a current the magnitude of which varies in accordance with the intensity of the impinging radiation, and hence serves as an index of the thickness of the sheet.

The Ohmart cell or radiant energy electric generator 11 comprises a positive electrode 13 and a negative electrode 14 in contact with the quantity of ionizable gas. The structural details of various types of Ohmart cells are shown in my copending application, "Ohmart Cells for Measuring Radiation," Serial No. 259,341, filed December 1, 1951. Various metals and their oxides form suitable electrode materials; one preferred type of cell comprises a positive electrode of lead dioxide, and a negative electrode formed of zinc. Any gas or mixture of gases can be employed as a filling gas; some of the more suitable being oxygen, nitrogen, air and argon.

The two electrodes of the cell are connected through leads 15 and 16 across a load impedance 17; an amplifier 18 is also connected to the load resistance. The amplifier may be of any suitable type for either measuring the potential developed by the cell across load impedance 17, or for amplifying the current output of the cell flowing through the load impedance. The amplifier powers a meter shown diagrammatically by means of dial 20 and hand 21, the meter preferably being calibrated to read the thickness of strip 12 directly in inches or other units. If desired, the meter can be replaced or supplemented by an automatic recording device which records the thickness of the material on a chart or the like. The exact details of this apparatus are of no concern in the present application, the only important thing being that the current output of the Ohmart cell is used either directly or indirectly (in the form of a potential developed across the load impedance) to drive a device for indicating the thickness of sheet 12.

According to this invention the cell is constructed and operated with less than an eighty-five percent ion utilization efficiency; consequently the random fluctuations in the current output of the cell are minimized and needle 21 of the meter will provide a steady indication of the actual thickness of the strip 12. The manner in which the cell is constructed and operated in order to achieve this result is explained in detail below in conjunction with the description of the graphs shown in Figures 3–8.

Figure 2:
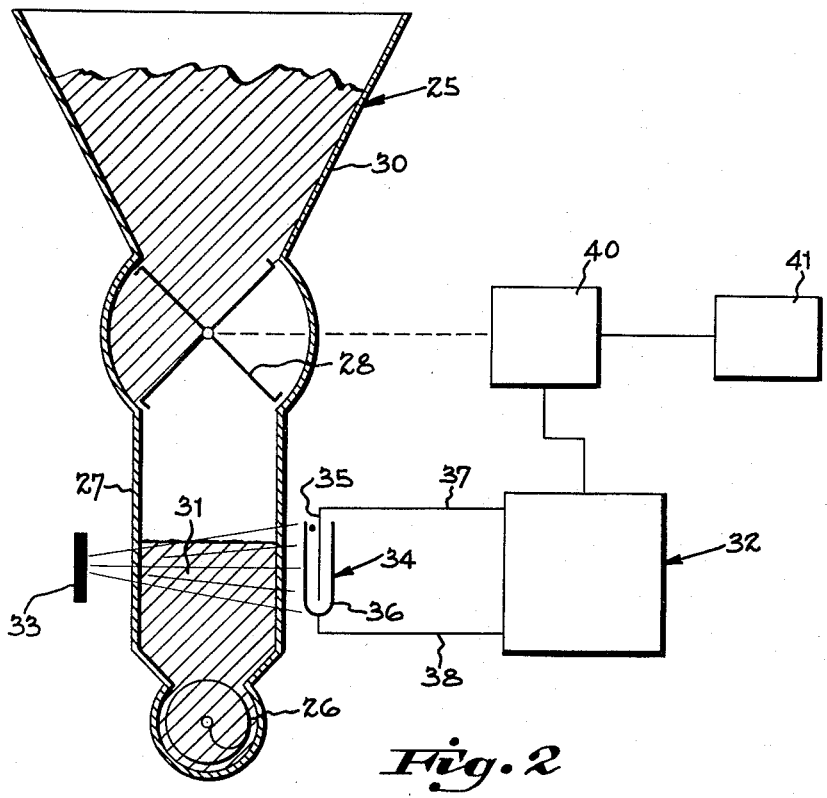
Figure 2 is a diagrammatic view of a control device constructed in accordance with the present invention.

Figure 2 shows a typical installation in which an Ohmart cell is employed in conjunction with a control device adapted to maintain a variable condition at a predetermined value. As there shown the control device governs the operation of feeder 25 for a coal pulverizer. The feeder comprises a screw feed 26 disposed at the bottom of a vertical chamber 27, the upper end of which contains a rotating star feeder 28, communicating with a coal hopper 30 mounted above the star wheel. In such an installation it is often desired to maintain the level of pulverized coal 31 within the cylindrical chamber 27 at a predetermined level. An automatic control apparatus 32 is provided to operate the star feed whenever pulverized coal 31 is removed from chamber 27, thereby maintaining the height of coal within the chamber at the predetermined level.

The control apparatus 32 comprises a source of radioactive material 33 disposed on one side of chamber 27 and an Ohmart cell 34 disposed on the opposite side of the chamber. The positive electrode 35, and the negative electrode 36 of the cell are connected through leads 37 and 38 to a suitable amplifying and control mechanism; for example, a Brown Electronik Electrometer equipped with a pneumatic control, the pneumatic control being actuable in response to a selected magnitude of current produced by the Ohmart cell. The pneumatic control is in turn connected to a Vickers drive shown at 40 which interconnects drive motor 41 with the star feeder 28. Again the details of this specific installation are of no importance to the present invention other than for the fact that it illustrates a typical embodiment in which the current output of an Ohmart cell actuates control apparatus for effecting the value of a variable condition.

In the installation shown, it is apparent that as the level of the coal within chamber 27 drops, more of the radiation emitted from source 33 impinge directly upon Ohmart cell 34. Consequently, a greater number of ions is formed within the gas in that cell, and a larger current flows to the controller. On the other hand, if the level of the coal rises, a greater quantity of absorber is in turn interposed between the source and cell, so that a lesser quantity of radiation impinges upon the cell, reducing the number of ions formed, and decreasing the magnitude of the current supplied by the cell to the controller.

For the desired level of coal within the chamber 27 there exists a predetermined value of the current output of the cell, and whenever the coal drops below the desired level the current will increase beyond its predetermined value and will actuate the controller which in turn actuates the Vickers drive causing the star feeder to rotate and supply more coal to the chamber. By constructing and operating the Ohmart cell in accordance with the present invention, the current output of the cell will not be increased due to random fluctuations and the controller and Vickers drive will not be actuated unless the coal drops below its predetermined level.

The principles for constructing and operating an Ohmart cell so that the noise level of the control or measuring system will be minimized can best be understood from a study of Figures 3–8 showing the relationship of several variable factors associated with a cell. It is to be understood that only one of these factors is varied at a time, the remaining ones being kept at a constant value.

Figure 3:
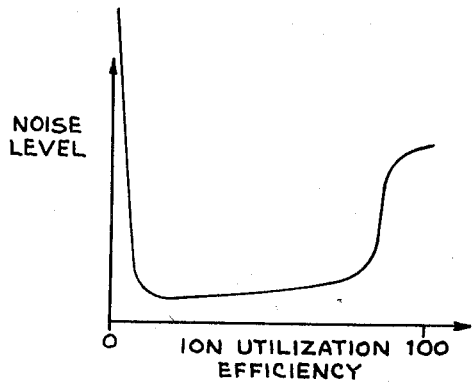
Figure 3 is a graph showing the relationship between noise level and ion utilization efficiency.

Figure 3 is a graph showing the relationship between noise level and the ion utilization efficiency of the cell from which it can be seen that if a cell is constructed and operated at an ion utilization efficiency of near zero, the noise level of the system is exceedingly large since the ion plasma within the cell is migrating promiscuously rather than unidirectionally as it does in the presence of strong bias field. However, as the ion utilization efficiency is increased, the noise level rapidly drops off and reaches a minimum value at an ion utilization efficiency of approximately five to ten percent. From this point the noise level rises only slightly as the ion utilization efficiency increases to a value in the neighborhood of eighty-five percent. In this range, from approximately ten to ninety percent, the field bias created by the chemical asymmetry of the electrodes is effective to cause a discriminatory migration of the positive ions and electrons but is ineffective to cause all of the positive ions to reach the positive electrode, before they combine with electrons in the gaseous space to again form neutral molecules.

According to my postulation, the migrating positive ions become relatively compacted in the vicinity of the positive electrode, forming a dense ion cloud. The positive electrode is ineffective to instantaneously attract all of the ions constituting the cloud. Therefore, if the rate of ion formation in the gaseous space is instantaneously increased, due to a random variation in radiant intensity, the progress of the additional ions towards the electrode is impeded by the cloud, and the number of ions actually reaching the electrode is not appreciably altered. Similarly, if there should be a sudden drop in the number of ions formed, the dense cloud will continue to supply substantially the same number of ions to the positive electrode, at least for a brief period. Thus, during any minute period, changes in radiant intensity will not cause random current fluctuations, or noise, but rather the current output of the cell will reflect the average rate of ion formation. Of course, if the radiant intensity is increased or decreased for any appreciable period, it will cause the ion cloud to become more or less dense, and consequently, the current output of the cell will be altered to a value which again accurately reflects the intensity of the impinging radiations.

If the cell is operated at an ion utilization efficiency of above approximately eighty-five percent, the noise level rapidly rises until, at approximately one hundred percent ion utilization efficiency, it has a value many times in excess of its minimum value. In accordance with the cell operation explained above, this rise in noise level is due to the fact that at this extremely high ion utilization efficiency the ions are attracted to the electrode almost as rapidly as they are formed, and there is no dense ion cloud adjacent to the positive electrode to supply additional ions or impede ion flow, thereby stabilizing the current magnitude.

Figure 4:
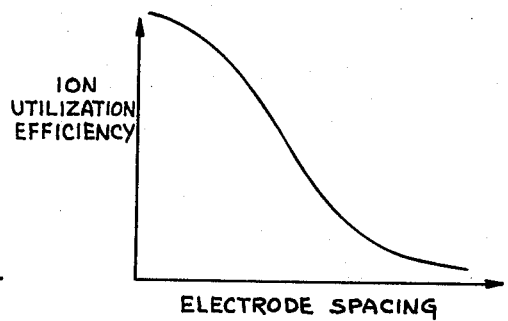
Figure 4 is a graph showing the relationship between ion utilization efficiency and electrode spacing.

Each of the remaining graphs shows the effect of one variable, or parameter, upon the ion utilization efficiency of a cell. Thus, for example, Figure 4 shows the manner in which ion utilization efficiency varies with electrode spacing. As there shown, the ion utilization efficiency of the cell is maximum when the electrodes are closely spaced. This is due to the fact that there are fewer ions in the plasma to be influenced by the electrodes, and furthermore, the field bias has a larger gradient when the electrodes are closely spaced, Consequently, the field is never dissipated to a point at which it is effective to cause substantially all of the ions to reach the positive electrode before they recombine in the gaseous space. As the electrode spacing is increased, however, the effectiveness of the electrodes to influence all of the ions diminishes, and consequently the ion utilization effciency decreases. This quantity continues to decrease as the electrodes are spaced further and further apart and asymptotically approaches zero for large values of electrode spacing.

Figure 5:
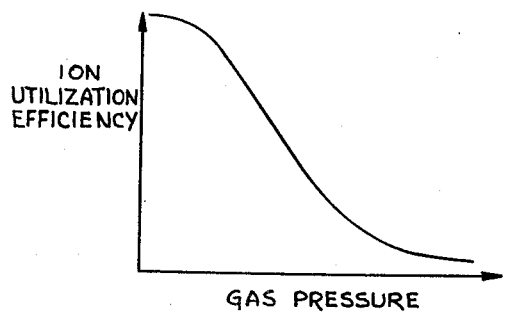
Figure 5 is a graph showing the relationship between ion utilization efficiency and gas pressure.

Figure 5 shows the effect of gas pressure on ion utilization efficiency. It will be appreciated that since the remaining factors are held constant, the number of molecules in the plasma is determined by the gas pressure. Consequently, for very low gas pressures, there are relatively few ions produced in the plasma and no cloud is formed to impede the progress of these ions toward the positive electrode, nor are there as many electrons with which the ions may effect a recombination. Therefore, for low gas pressures substantially all of the ions formed are attracted to the electrode, and the cell has a maximum ion utilization efficiency. As the gas pressure is increased, however, the number of molecules available for ionization similarly increases and, at least in the presence of a sufficient quantity of radio-activity, an ion cloud is formed as previously described so that the ion utilization efficiency of the cell decreases.

Figure 6:
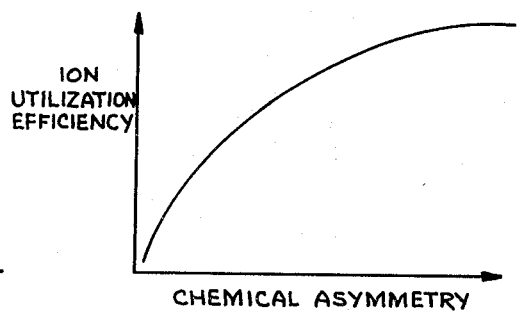
Figure 6 is a graph showing the relationship of ion utilization efficiency to the chemical asymmetry of the electrodes.

Figure 6 is a graph of the manner in which ion utilization efficiency depends upon the chemical asymmetry of the electrodes. As shown in that figure, when the electrodes are constructed of materials having little or no chemical asymmetry, the ion utilization efficiency is very small. This is due to the fact that the field bias created by nearly identical electrodes is extremely minute and consequently is not effective to influence more than a small fraction of the ions formed, the majority of the ions moving randomly within the plasma and recombining in the gaseous space. For electrodes having greater chemical asymmetry the field bias is correspondingly stronger, and the ion utilization efficiency also rises until it approaches a maximum as the chemical asymmetry of the electrodes increases.

Figure 7:
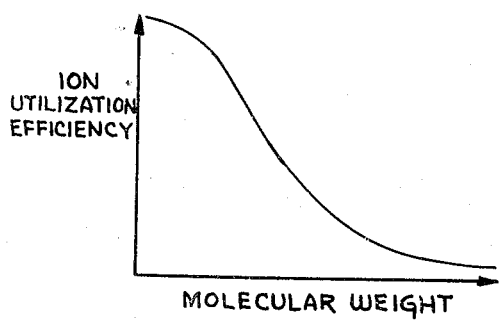
Figure 7 is a graph showing the relationship between ion utilization efficiency and the molecular weight of the filling gas.

Figure 7 shows the variation of ion utilization efficiency with the molecular weight of the filling gas. It is apparent from this figure that ion utilization efficiency of a cell is highest for gases of low molecular weight, such as hydrogen and helium, and decreases with increase in the molecular weight of the filling gas. It is the greater mobility of the light ions, which results in their more rapid movement toward the electrodes, that at least largely accounts for the fact that under equal conditions more ions of a light gas will be neutralized at the positive electrode than is the case with a heavier gas. It is to be understood that characteristics other than the molecular weight of the filling gas also influence the ion utilization efficiency of a cell. These characteristics include the ionizing potential of the gas and its tendency to form both negative and positive ions as opposed to the formation of positive ions and free electrons. These two characteristics of the filling gas will not be considered in detail here, but it generally can be stated that the ion utilization efficiency of a cell decreases with increases in the ionizing potential of the filling gas and is also lower for a gas forming negative ions than it is for a gas in which such ions are not formed.

Figure 8:
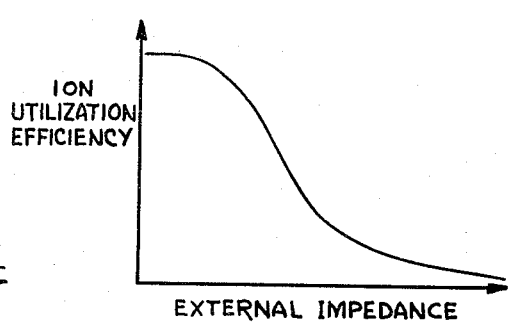
Figure 8 is a graph showing the relationship between ion utilization efficiency and external impedance.

Figure 8 indicates the effect of external impedance upon ion utilization efficiency. The curve of Figure 8 shows that the ion utilization efficiency of a cell is maximum for very low values of impedance and drops off, asymptotically approaching zero as the impedance increases to extremely large values. Relating this figure to the disclosure of my copending applications, so long as the external impedance is below the critical value, the cell effectively influences substantially all of the ions constituting the plasma and therefore has a maximum ion utilization efficiency. As the impedance is increased the flow of electrons through the external circuit is sufficiently impeded so that an insufficient number of electrons are delivered to the positive electrodes to neutralize all of the available positive ions. Some of these ions therefore recombine and are neutralized in the gaseous space, rather than at the electrode.

The easiest factor to vary is the external impedance, and indeed in many applications it is preferable to vary this quantity for that reason. However, as explained in my copending applications, an Ohmart cell is unique in that the external circuit greatly influences the internal operation of the cell, causing it to exhibit such characteristics as nonlinear current development, etc. Also, in many applications, when Ohmart cells are connected in parallel opposition the impedance of the external circuit of the cell does not affect its ion utilization efficiency since the electrons supplied to the positive electrode can be supplied by the second cell as well as its own associated negative electrode. Therefore, when the cell characteristics associated with a high load impedance are not desired, or when cells are connected in opposition, it is necessary to vary one of the other factors.

The second most easily varied factor is the gas pressure, and I shall now describe a method of constructing a cell so that it has a predetermined ion utilization efficiency by varying this factor. In accordance with this method, a cell is constructed as disclosed in any of my copending applications and is filled with gas at a predetermined pressure. Then an external voltage source is applied to the electrodes of the cell and the cell exposed to a predetermined quantity of radiant energy. The external potential is increased until the current output of the cell reaches a maximum value. Next, the external potential is removed and the current output of the cell observed. The pressure of the filling gas is then adjusted until the current output of the cell equals a predetermined fraction of the maximum current output. Thus, for example, if it is desired to construct a cell having an ion utilization efficiency of seventy percent and the maximum current output of the cell is found to be $2 \times 10^{-10}$ amperes, the current is measured after the external potential is removed and the gas pressure is adjusted until the current output of the cell reaches $1.4 \times 10^{-10}$ amperes, at which time the cell will be operating at approximately seventy percent ion utilization efficiency.

However, since the gas pressure has been changed, the current produced by the cell when operated at one hundred percent ion utilization efficiency will differ slightly from the current previously produced at one hundred percent efficiency. Therefore, an external potential should again be applied to the cell to determine the new maximum current it produces, and the gas pressure again adjusted so that the cell produces seventy percent of this new maximum current. If desired, this procedure can be repeated until the cell is operated at precisely the predetermined ion utilization efficiency.

Instead of adjusting gas pressure, the electrode spacing may be adjusted, or the composition of the filling gas may be changed, or the chemical asymmetry of the electrodes may be changed by the substitution of new electrodes. In any case, however, the ion utilization efficiency of the cell may be determined by comparing the current output of the cell with its maximum current output. Also, no matter which variable factor is regulated, the ion utilization efficiency of the cell should be between ten and eighty-five percent to provide a system having an extremely low noise level.

In order that the significance of providing a measuring system having a minimum noise level may be fully appreciated, a typical installation similar to that shown in Figure 1 will be briefly described. Suppose that, with apparatus arranged as shown in Figure 1, it is desired to measure the density of a strip of material with a precision of plus or minus one percent. The current output of an Ohmart cell when employed to index this quantity is approximately $3 \times 10^{-10}$; and the full scale needle deflection of the measuring instrument is equal to $3 \times 10^{-11}$ amperes. Hence, in order to measure the density of the strip of material with the desired precision, the current must be measured to within $3 \times 10^{-13}$ amperes, and the noise level of the cell must therefore be kept below one tenth of one percent. The following table gives specific values for the ion utilization efficiency and noise level of a particular cell adapted for use in such a measuring device.

| Ion Collection Efficiency, Percent | Relative Noise, Percent |
|---|---|
| 37.7 | ±.05 |
| 50.0 | ±.06 |
| 56.0 | ±.15 |
| 60.0 | ±.25 |
| 64.7 | ±.30 |
| 68.2 | ±.35 |
| 72.5 | ±.30 |
| 76.8 | ±.35 |
| 80.5 | ±.40 |
| 83.3 | ±.45 |
| 85.5 | ±.55 |
| 89.5 | ±.75 |
| 93.0 | ±1.0 |

It is apparent that in order to make measurements of the desired precision with this particular arrangement, the system has to be operated at an ion utilization efficiency of approximately fifty percent or less. In order to do this the cell is adjusted prior to use as explained above or the load impedance of the cell is varied to secure the desired result.

Having described my invention I claim:

1. A system for controlling the value of a variable condition, said system comprising a radiant energy electric generator, said radiant energy electric generator including two spaced electrochemically dissimilar electrodes and an ionizable gas in contact with said electrodes, the electrochemical dissimilarity of said electrodes creating the sole field bias whereby said radiant energy electric generator is effective to generate a continuous current when exposed to radiant energy, an external circuit connected to said generator, apparatus for effecting the variable condition in response to the current output of the radiant energy electric generator, a source of radiant energy, said source of radiant energy and said radiant energy electric generator being disposed relative to said variable condition, whereby said condition is effective to attenuate the intensity of the radiation impinging upon said radiant energy electric generator, the impedance of said external circuit in connection with said radiant energy electric generator and the generator construction being such that the ion utilization efficiency of said generator is below eighty-five percent, whereby the radiant energy electric generator is effective to generate a continuous current, the magnitude of which is correlated with the value of the variable condition, the noise level of said current being minimized.

2. A system for measuring the value of a variable condition, said system comprising a radiant energy electric generator, said radiant energy electric generator including two spaced electrochemically dissimilar electrodes and an ionizable gas in contact with said electrodes, the electrochemical dissimilarity of said electrodes creating the sole field bias whereby said radiant energy electric generator is effective to generate a continuous current when exposed to radiant energy, an external circuit connected to said generator, said external circuit including means for indicating the value of the variable condition in response to the current output of the radiant energy electric generator, a source of radiant energy, said source of radiant energy and said radiant energy electric generator being disposed relative to said variable condition, whereby said condition is effective to attenuate the intensity of the radiation impinging upon said generator, the impedance of said external circuit in connection with said generator and the generator construction being such that the ion utilization efficiency of said generator is below eighty-five percent, whereby the radiant energy electric generator is effective to generate a continuous current, the magnitude of which is correlated with the value of the variable condition, the noise level of said current being minimized.

3. In a system for generating an electrical current, the magnitude of which is correlated with the magnitude of the variable condition, the combination of a radiant energy electric generator, said radiant energy electric generator including two spaced electrochemically dissimilar electrodes and an ionizable gas in contact with said electrodes, the electrochemical dissimilarity of said electrodes creating the sole field bias whereby said radiant energy electric generator is effective to generate a continuous current when exposed to radiant energy, an external circuit connected to said generator, said external circuit including a device operated in response to the current output of the radiant energy electric generator, a source of radiant energy, said source of radiant energy and said radiant energy electric generator being disposed relative to said variable condition, whereby said condition is effective to attenuate the intensity of the radiation impinging upon said generator, the impedance of said external circuit in connection with said generator and the generator construction being such that the ion utilization efficiency of said generator is below eighty-five percent, whereby the radiant energy electric generator is effective to generate a continuous current, the magnitude of which is correlated with the value of the variable condition, the noise level of said current being minimized.

4. A system for controlling the value of a variable condition, said system comprising a radiant energy electric generator, said radiant energy electric generator including two spaced electrochemically dissimilar electrodes and an ionizable gas in contact with said electrodes, the electrochemical dissimilarity of said electrodes creating the sole field bias whereby said radiant energy electric generator is effective to generate a continuous current when exposed to radiant energy, an external circuit connected to said generator, apparatus for affecting the variable condition in response to the current output of the radiant energy electric generator, a source of radiant energy, said source of radiant energy and said radiant energy electric generator being disposed relative to said variable condition, whereby said condition is effective to attenuate the intensity of the radiation impinging upon said radiant energy electric generator, the impedance of said external circuit in connection with said radiant energy electric generator and the generator construction being such that the ion utilization efficiency of said generator is above ten percent and below eighty-five percent, whereby the radiant energy electric generator is effective to generate a continuous current, the magnitude of which is correlated with the value of the variable condition, the noise level of said current being minimized.

5. A system for measuring the value of a variable condition, said system comprising a radiant energy electric generator, said radiant energy electric generator including two spaced electrochemically dissimilar electrodes and an ionizable gas in contact with said electrodes, the electrochemical dissimilarity of said electrodes creating the sole field bias whereby said radiant energy electric generator is effective to generate a continuous current when exposed to radiant energy, an external circuit connected to said generator, said external circuit including means for indicating the value of the variable condition in response to the current output of the radiant energy electric generator, a source of radiant energy, said source of radiant energy and said radiant energy electric generator being disposed relative to said variable condition, whereby said condition is effective to attenuate the intensity of the radiation impinging upon said generator, the impedance of said external circuit in connection with said generator and the generator construction being such that the ion utilization efficiency of said generator is above ten percent and below eighty-five percent, whereby the radiant energy electric generator is effective to generate a continuous current, the magnitude of which is correlated with the value of the variable condition, the noise level of said current being minimized.

References Cited in the file of this patent

UNITED STATES PATENTS

| | | |
|---|---|---|
| 2,397,071 | Hare | Mar. 19, 1946 |
| 2,602,914 | Schlesman et al. | July 8, 1952 |
| 2,617,088 | Cohen | Nov. 4, 1952 |
| 2,696,564 | Ohmart | Dec. 7, 1954 |
| 2,728,862 | Bourgknecht | Dec. 27, 1955 |

OTHER REFERENCES

"A New Electronic Battery," The Electrician, Oct. 31, 1924, vol. 10, page 497.

A New Use for X-Rays in Industry, Woods et al., Electronics, April 1941, pp. 29-31, 90 and 91.

"Electron and Nuclear Counters," Korff, published by Van Nostrand Co., New York, N.Y., 1946, Fourth Printing, pp. 68-79.

Thickness Gaging by Radiation Absorption Methods, Clapp et al., General Electric Review, November 1950, pages 39-42.